(12) United States Patent
Lee et al.

(10) Patent No.: US 6,172,598 B1
(45) Date of Patent: Jan. 9, 2001

(54) VEHICLE MOTION INDICATOR

(76) Inventors: Young Lee, 16924 S. Western Ave., Gardena, CA (US) 90247; Jean Lee, 525 N. Sycamore Ave., #304, Los Angeles, CA (US) 90036

( * ) Notice: Under 35 U.S.C. 154(b), the term of this patent shall be extended for 0 days.

(21) Appl. No.: 09/451,028

(22) Filed: Nov. 29, 1999

(51) Int. Cl.[7] ..................... B60Q 1/00
(52) U.S. Cl. ............. 340/425.5; 340/463; 340/472; 340/473; 340/479; 340/480; 116/36; 116/46; 362/4
(58) Field of Search .................. 340/463, 464, 340/467, 468, 472, 473, 471, 479, 480–490; 116/35 R, 36, 37, 46, 49, 58 A, 28 R; 40/591, 592, 593; 362/496, 493, 487, 503

(56) References Cited

U.S. PATENT DOCUMENTS

| | | | |
|---|---|---|---|
| 2,408,590 | 10/1946 | Williams | 177/329 |
| 2,473,631 | * 6/1949 | Beemer | 340/480 |
| 2,578,562 | 12/1951 | Lapadura | 177/339 |
| 3,213,419 | 10/1965 | Stults | 340/87 |
| 3,531,634 | 9/1970 | Plouch | 240/7.1 |
| 3,610,917 | 10/1971 | Hunt | 240/10 P |
| 4,916,584 | 4/1990 | Gustafson | 362/61 |
| 5,182,146 | 1/1993 | O'Hara | 428/31 |
| 5,502,909 | * 4/1996 | Rabkin | 40/603 |
| 5,619,182 | * 4/1997 | Robb | 340/479 |
| 5,683,162 | * 11/1997 | Oh | 362/540 |
| 5,734,320 | * 3/1998 | Suzuki | 430/473 |

* cited by examiner

Primary Examiner—Daryl Pope
(74) Attorney, Agent, or Firm—John K. Park; Park & Sutton LLP

(57) ABSTRACT

A vehicle motion indicator having a base; a shaft rotatably attached to the base; at least one winder having a hub attached to the shaft; a motor for rotating the shaft to rotate the winder; and switch means responsive to the brake system in the vehicle, such that: (1) when the brake system is engaged, the switch means electrically connects the motor to a power supply in the vehicle to rotate the winder, and (2) when the brake system is disengaged the switch means electrically disconnects the motor from the power supply to stop rotation of the winder.

20 Claims, 3 Drawing Sheets

VEHICLE MOTION INDICATOR

FIELD OF THE INVENTION

The present invention relates to electrical displays for vehicles, and more particularly to electrical displays indicating the motion of a vehicle.

BACKGROUND OF THE INVENTION

Vehicles such as automobiles utilize lighting systems for illuminating the road, and for communication with other drivers. For example, turn signals are used for informing other drivers of an intent to make a turn. More importantly, brake lights are used for informing other drivers of an imminent slowing or stopping. Conventional brake lights includes a light bulb disposed in a housing at the rear of a vehicle, wherein the brake light is activated when the brake pedal is depressed, and deactivated when the brake pedal is released.

For example, U.S. Pat. No. 4,916,584 issued to Gustanfson discloses a display which is in the form of a sheet of transparent material having imprinted on one side thereof the upper portion of a head of an animal and having on the other side a layer of a non-permanent adhesive. The display is mounted on the rear window of an automobile, the automobile being of the type which includes a brake light on the rear window. The display is mounted on the window such that the brake light is where the nose of the animal would be located. In use, when the brakes are applied, the brake light is turned on giving the appearance that the nose intermittently lights up. In another example, U.S. Pat. No. 3,213,419 issued to T. W. Stults, discloses a safety beacon stop light which may be radially installed upon a rod on top of an automobile and which may be electrically connected to the conventional stop light lamps in the rear of the vehicle, and operable in unison with the stop lights when the automobile brake is depressed. However, neither apparatus provides a means of communicating application of the vehicle brakes by a moving indicator.

Other conventional means of communicating vehicle motion are attaching roller blades or figurines to vehicles, where flow of air past the blades of figurines attached to a moving vehicle causes them to rotate. For example, U.S. Pat. No. 5,182,146 issued to O'Hara discloses an air speed indicator for use in combination with a vehicle having an exterior surface. The indicator comprises a shaft mounted to the vehicle by a means of a mounting member such that the shaft is angled away from the direction of relative airflow. A propeller is mounted on the shaft through a tapered opening that enables the propeller to process on the shaft and thereby change the axis of rotation with consequent changes in the direction of movement of the propeller on the shaft. However, the propeller system is only activated by air flow past a moving vehicle.

There is, therefore, a need for a prominent and motion based means of communicating driver operation of a vehicle's brakes.

BRIEF SUMMARY OF THE INVENTION

The present invention satisfies these needs. In one embodiment, the present invention provides a motion indicator for use on a vehicle, comprising: a base; a shaft rotatably attached to the base; at least one winder having a hub attached to the shaft; a motor for rotating the shaft to rotate the winder; and switch means responsive to the brake system in the vehicle, such that: (1) when the brake system is engaged, the switch means electrically connects the motor to a power supply in the vehicle to rotate the winder, and (2) when the brake system is disengaged the switch means electrically disconnects the motor from the power supply to stop rotation of the winder. The base can include means for attaching the motion indicator to the exterior of the vehicle, and the motor can be attached to the base. The power supply can comprise the electrical system of the vehicle to provide electrical power when the vehicle engine is started and running.

In another embodiment, the motion indicator further includes at least one brake light responsive to the vehicles' brake system, such that when the brake system is engaged the brake light turns on, and when the brake system is disengaged the brake light is turned off. The brake light can be attached to the hub of the winder. The winder can include winding arms extending outwardly from the hub, and the brake light can be attached to the winding arms.

The broad planar surfaces of the winding arms are perpendicular to the top surface of the base, causing significant wind resistance to the rotation of the winding arms. The winding arms can be of substantial surface area, which creates even greater resistance to the rotation. The winding arms are substantial in width thus presenting an aesthetically appealing and whimsical effect when viewed by another driver. Conversely when the car is moving the wind resistance of the winding arms is significantly reduced in comparison to prior art devices, because during portions of the rotation the winding arms present a very thin profile in relation to the forward direction of the vehicle. When a substantial aperture is added to the winding arm wind resistance is further reduced.

Prior art devices, by example that of U.S. Pat. No. 2,473,631 by H. J. Beemer have a winding arm or propeller like blade with the broadest portion of their face that is parallel to the surface where the shaft exits the motor base, as such they do seek to minimize the wind resistance from the rotating blade, but create significant wind resistance to the forward movement of the vehicle.

The winding arms can be of substantial surface area. In one embodiment the winding arms can slow and stop their rotation when the brakes are applied. This allows the winding arms to create the image and effect of a wind-up toy that slows and stops the rotation of its winding key when the vehicle begins to decrease velocity and come to a complete stop. This slowing and stopping of rotation when braking does decrease the visibility of any brake indicator lights that may be attached to the winding arms.

DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
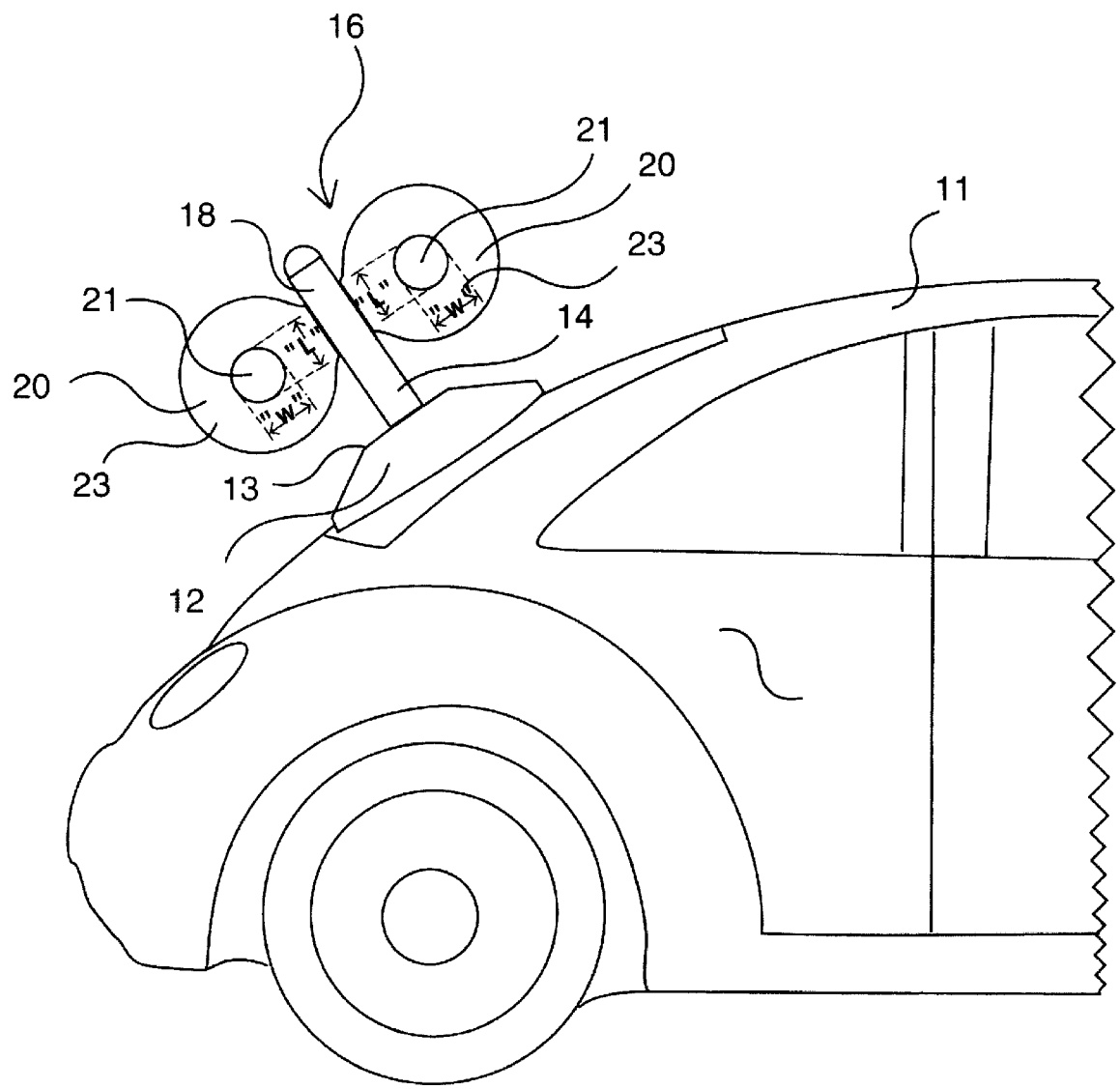
FIG. 1 shows a side view of an embodiment of a motion indicator according to the present invention attached to a vehicle.
Figure 2:
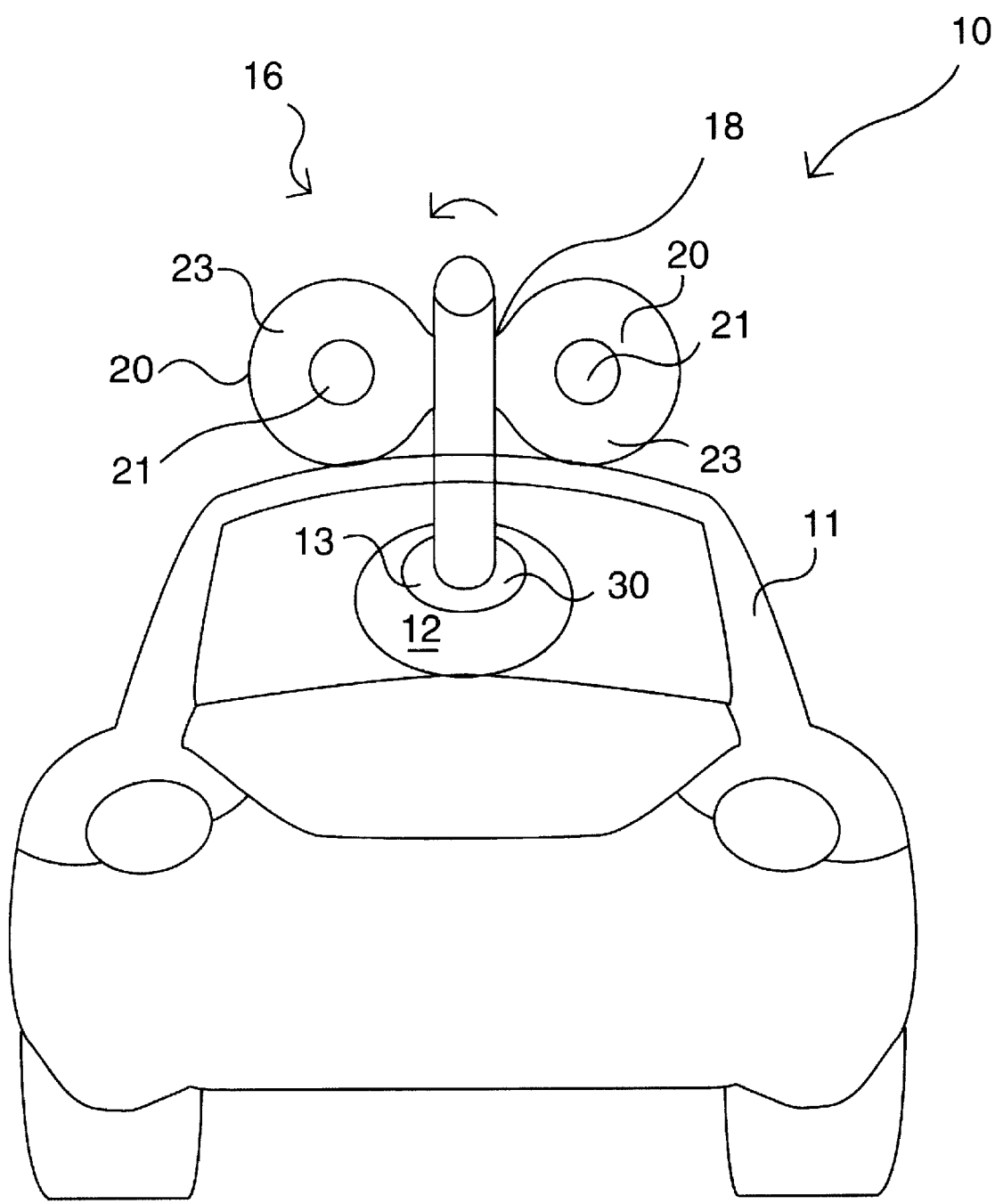
FIG. 2 shows a rear view of the motion indicator of FIG. 1.
Figure 3:
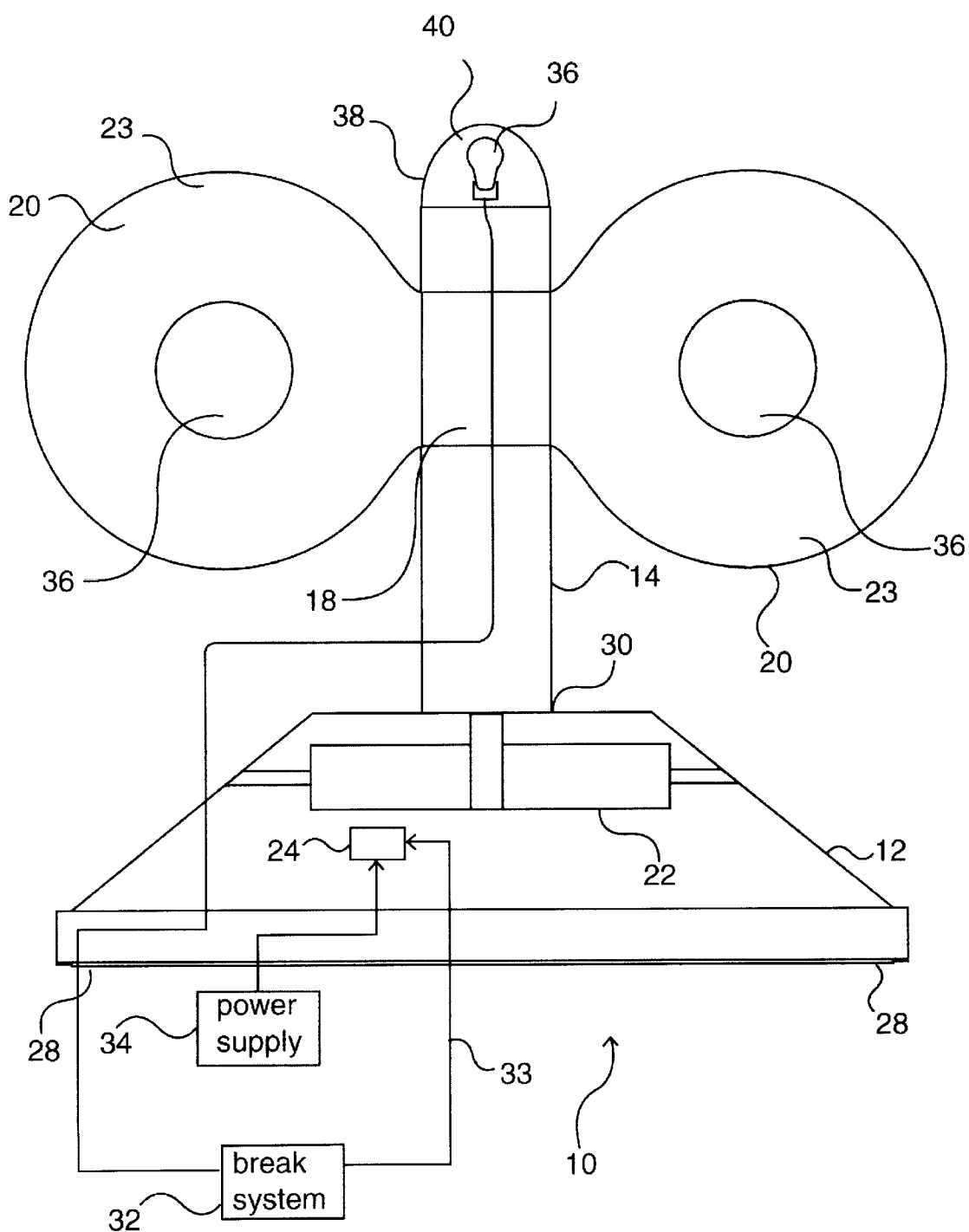
FIG. 3 shows sectional view of the motion indicator of FIG. 1 with a motor therein.

Referring to FIGS. 1–3, an embodiment of a motion indicator 10 according to the present invention is shown attached to a vehicle 11. The motion indicator 10 comprises: a base 12; a shaft 14 rotatably attached to the base 12; at least one winder 16 having a hub 18 attached to the shaft 14; a motor 22 for rotating the shaft 14 to rotate the winder 16; and switch means 24 responsive to a brake system 32 in the vehicle 11, such that: (1) when the brake system 32 is engaged, the switch means 24 electrically connects the motor 22 to a power supply 34 in the vehicle 11 to rotate the winder 16, and (2) when the brake system 32 is disengaged the switch means 24 electrically disconnects the motor 22 from the power supply 34 to stop rotation of the winder 16.

In one embodiment, the base 12 comprises a housing 13 that can be attached to the vehicle 11 by attachment means 28 such as suction cups, glue, magnets, screws, straps, etc. as is known to practitioners in the art. The housing 13 can be substantially a partial cone shape as shown. Other shapes for the base 12 are also possible and contemplated by the present invention. The base 12 has an opening 30 for rotatably receiving the shaft 14 therethrough. For example, the shaft 14 can be from about 3 to about 20 inches long, and from about 1 to about 5 inches wide. The winder 16 includes winding arms 20 extending radially outwardly from the hub 18. The winding arms 20 are thin, large and broad with a substantial surface area creating a toy like or whimsical appearance to the viewer. The winding arms 20 have a flat planar surface 23, a width "W", length "L" and thickness "T". The width "W" is at least one fourth of the length "L". The thickness "T" is substantially less than the width "W". The base 12 has a top surface 13. The flat planar surface 23 is perpendicular to the top surface 13 of the base 12. The toy-like effect is especially pronounced when the motion indictor 10 is secured to a Volkswagen Beatle, creating a whimsical and humorous presentation to the viewer. FIG. 1 illustrates a vehicle 11 in a design similar to a Volkswagen Beatle. The winding arms 20 may be solid without a hole or there can be a substantial aperture 21 located about the center of each of the winding arms 10, as illustrated in FIG. 1 and FIG. 2. The aperture 21 has a width "w" and length "l" such that the width "w" is at least one fourth of the length "l". Two winding arms 10 each with a large center aperture 21 produce the image of a toy car with a manual toy winder mechanism for propulsion of the toy. The length "L" of the winding arms 20 extend outward from the shaft 14. For example, each arm 20 can be from about 3 to about 14 inches long, and from about 1 to about 10 inches wide. The winder 16 can be made from materials such as plastics or metals and fixedly attached to the hub. Preferably the motor 22 is disposed in the base 12 by attaching the motor 22 to the inner walls of the base 12. The shaft 14 is connected to the motor 22 such that when electrical power is applied to the motor 22, the motor rotates the shaft 14 and thereby the winder 16. The motor 22 can comprise an electrical motor which when connected to the power supply 34, rotates the winder 16 from about 0 to about 200 or more revolutions per minute.

The inventor believes that the most preferred version can have the shaft 14 about 10 inch long and about 2.5 inch wide, and the winder 16 with winding arms 20 of about 8 inches long and about 4 inches wide. The winder can be made of plastic and the rotation of the winder can be about 100 revolutions per minute.

Typically, the brake system 32 is engaged when a driver depresses a brake pedal (not shown) in the vehicle 11 to slow the vehicle, and the brake system 32 is disengaged when the driver releases the brake pedal. The switch means 24 can be electrically connected to a signal from the vehicle's brake system 32 via an electrical line 33 to indicate when the brake system 32 is engaged (i.e. brake pedal has been depressed) and when the brake system 32 is disengaged (i.e. brake pedal has been released). In response to that signal, the switch means 24: (1) electrically connects the motor 22 to the power supply 34 when the brake pedal is released, and (2) electrically disconnects the motor 22 from the power supply 34 when the brake pedal is depressed. The power supply 34 can comprise the vehicle's electrical system such as battery or generator, or an independent power supply such as batteries placed in the base 12. Said signal can comprise the electrical current in the vehicle that turn the vehicle's existing brake bulbs on and off when the brake pedal is depressed and released, respectively.

As an alternate design, switch means 24 can also be designed such that: (1) when the brake system 32 is engaged, the switch means 24 electrically adjusts the power supplied to the motor 22 so that the winder 16 rotates at a first predetermined speed of rotation, and (2) when the brake system 32 is disengaged the switch means 24 electrically adjusts the power supplied to the motor 22 so that the winder 16 rotates at a second predetermined speed of rotation. The second predetermined speed of rotation can be faster or slower than the first predetermined speed of rotation, can be incrementally adjusted according to the speed of the vehicle, and can also include no rotation.

In a variation of the present invention, the winder 16 and attached winding arms 20 slow down and reduce their velocity of rotation when the brake system 32 is engaged and the vehicle slows down. Also, a break light 36 attached to the winding arms 20 or hub 18 illuminates as the vehicle 11 begins to slow down when the brake system 32 is engaged. Again, this effect creates the image of a wind-up toy car where the wound spring has expended all of its stored mechanical energy and the winding arms 20 simulate a toy winding key that is slowing its rotation velocity and stopping.

In one example, the power supply 34 provides electrical power to the motion indicator 10 only when the vehicle engine is started and running. In another example, the power supply 34 provides electrical power to the motion indicator 10 when the vehicle's electrical system is activated such as by a turn of the vehicle's ignition switch without starting the engine.

The motion indicator 10 can further include at least one brake light 36 responsive to the brake system 32 in the vehicle 11, such that when the brake system 32 is engaged the brake light 36 is turned on, and when the brake system 32 is disengaged the brake light 36 is turned off. The hub 18 can have a hollow portion 38 with a transparent tip 40, and the brake light 36 can comprise a bulb disposed in the hub 18 for visibility. In another embodiment, a brake light 36 can be attached to each arm 20 of the winder 16. In the case each arm 20 can have e.g. at least a hollow portion with a transparent section for housing a brake light therein.

Alternatively, the shaft 14 can be hollow to allow passage of a support extending from the base 12 therethrough to house the brake light 36 proximate the hub 18, or the shaft tip. The light bulb 36 can be e.g. electrically connected to the vehicle's brake system 32 such as said electrical currents in the vehicle that turn the vehicle's existing brake bulbs on and off when the brake pedal is depressed and released, respectively. Alternatively, the motion indicator 10 can include a power supply therein for turning the indicator's brake lights 36 on and off via a switch in response to the depression and release of the vehicle's brake pedal, respectively.

The motion indicator 10 can be attached to the exterior of the vehicle 11 as shown in the drawings. Alternatively, the motion indicator 10 can be attached in the passenger compartment of the vehicle 11 e.g. behind the back light window. The indicator's brake light can comprise one or more bulbs, LEDs or other illuminating means.

In this embodiment, the motion indicator 10 provides an automobile stop indicator in the shape of a toy winder 16 that rotates via the motor 22 which is activated and deactivated by the switch 24. When the indicator is on, the motor 22 rotates the winder 16 so long as the vehicle engine moves the vehicle 11. The motor 22 stops rotating the winder 16 when the vehicle brakes are applied, and the motor 22 rotates the winder 16 again when the brakes are released. The brake light 36 is also turned on when the brake pedal is depressed, and turned off when the brake pedal is released.

Although the present invention has been described in considerable detail with regard to the preferred versions thereof, other versions are possible. Therefore, the appended claims should not be limited to the descriptions of the preferred versions contained herein.

What is claimed is:

1. A motion indicator for use on a vehicle, comprising:
    (a) a base having a top surface;
    (b) a shaft rotatably attached to the base;
    (c) at least one winder having a hub attached to the shaft; the winder having a winding arm extending outwardly from the hub, the winding arm having a flat planar surface, a width and a length, such that the width is at least one fourth of the length, wherein the flat planar surface is perpendicular to the top surface of the base;
    (d) a motor for rotating the shaft to rotate the winder; and
    (e) switch means responsive to the brake system in the vehicle, such that: (1) when the brake system is engaged, the switch means electrically connects the motor to a power supply to rotate the winder, and (2) when the brake system is disengaged the switch means electrically disconnects the motor from the power supply to stop rotation of the winder.

2. The motion indicator of claim 1 wherein said base includes means for attaching the motion indicator to the exterior of the vehicle.

3. The motion indicator of claim 1 wherein the motor is attached to the base.

4. The motion indicator of claim 1 wherein said power supply comprises the electrical system of the vehicle.

5. The motion indicator of claim 1 wherein the power supply provides electrical power only when the vehicle engine is started and running.

6. The motion indicator of claim 1 further comprising at least one brake light responsive to the brake system in the vehicle, such that when the brake system is engaged the brake light is turned on, and when the brake system is disengaged the brake light is turned off.

7. The motion indicator of claim 6, wherein the brake light is attached to the hub of the winder.

8. The motion indicator of claim 6, wherein the brake light is electrically connected to the vehicle's brake system.

9. A motion indicator for use on a vehicle, comprising:
    (a) a base having a top surface;
    (b) a shaft rotatably attached to the base;
    (c) at least one winder having a hub attached to the shaft; the winder having a winding arm extending outwardly from the hub, the winding arm having a flat planar surface, a width and a length, such that the width is at least one fourth of the length, wherein the flat planar surface is perpendicular to the top surface of the base;
    (d) a motor for rotating the shaft to rotate the winder; and
    (e) switch means responsive to the brake system in the vehicle, such that: (1) when the brake system is engaged, the switch means electrically adjusts the power supplied to the motor so that the winder rotates at a first predetermined speed of rotation, and (2) when the brake system is disengaged the switch means electrically adjusts the power supplied to the motor so that the winder rotates at a second predetermined speed of rotation, including no rotation.

10. The motion indicator of claim 9 wherein said base includes means for attaching the motion indicator to the exterior of the vehicle.

11. The motion indicator of claim 9 wherein the motor is attached to the base.

12. The motion indicator of claim 9 wherein said power supply comprises the electrical system of the vehicle.

13. The motion indicator of claim 9 wherein the power supply provides electrical power only when the vehicle engine is started and running.

14. The motion indicator of claim 9 further comprising at least one brake light responsive to the brake system in the vehicle, such that when the brake system is engaged the brake light is turned on, and when the brake system is disengaged the brake light is turned off.

15. A motion indicator for use on a vehicle, comprising:
    (a) a base having a top surface;
    (b) a shaft rotatably attached to the base;
    (c) at least one winder having a hub attached to the shaft; the winder having a winding arm; the winding arm having a substantial aperture, a flat planar surface, a width and a length; wherein the winding arm extends outwardly from the hub, such that the width is at least one fourth of the length, wherein the substantial aperture is located about the center of the winding arm; the aperture having a width and a length such that the width is at least one fourth of the length, wherein the flat planar surface is perpendicular to the top surface of the base;
    (d) a motor for rotating the shaft to rotate the winder; and
    (e) switch means responsive to the brake system in the vehicle, such that: (1) when the brake system is engaged, the switch means electrically adjusts the power supplied to the motor so that the winder rotates at a first predetermined speed of rotation, and (2) when the brake system is disengaged the switch means electrically adjusts the power supplied to the motor so that the winder rotates at a second predetermined speed of rotation, including no rotation.

16. The motion indicator of claim 15 wherein the second predetermined speed varies according to the speed of the vehicle.

17. The motion indicator of claim 15 wherein (1) the first predetermined speed of rotation is zero, and (2) the second predetermined speed of rotation is greater then zero.

18. The motion indicator of claim 6, wherein the brake light is attached to the winding arms.

19. The motion indicator of claim 14, wherein the brake light is attached to the winding arms.

20. The motion indicator of claim 14, wherein the brake light is attached to the hub of the winder.

* * * * *